United States Patent
Day et al.

(10) Patent No.: US 12,347,840 B2
(45) Date of Patent: Jul. 1, 2025

(54) BATTERY-INTEGRATED HEAT PUMP SYSTEMS AND METHODS THERETO

(71) Applicant: Rheem Manufacturing Company, Atlanta, GA (US)

(72) Inventors: Christopher Day, Colleyville, TX (US); Sivakumar Gopalnarayanan, Plano, TX (US); Yang Zou, Frisco, TX (US)

(73) Assignee: Rheem Manufacturing Company, Atlanta, GA (US)

( * ) Notice: Subject to any disclaimer, the term of this patent is extended or adjusted under 35 U.S.C. 154(b) by 181 days.

(21) Appl. No.: 17/223,148

(22) Filed: Apr. 6, 2021

(65) Prior Publication Data

US 2022/0320631 A1    Oct. 6, 2022

(51) Int. Cl.
*H01M 10/6564* (2014.01)
*H01M 10/42* (2006.01)
*H01M 10/48* (2006.01)
*H01M 10/62* (2014.01)
*H01M 10/635* (2014.01)

(52) U.S. Cl.
CPC ..... *H01M 10/6564* (2015.04); *H01M 10/425* (2013.01); *H01M 10/486* (2013.01); *H01M 10/62* (2015.04); *H01M 10/635* (2015.04); *H01M 2010/4278* (2013.01)

(58) Field of Classification Search
CPC ............. H01M 10/6564; H01M 10/62; H01M 10/635; H01M 10/425; H01M 10/486
See application file for complete search history.

(56) References Cited

U.S. PATENT DOCUMENTS

| | | | |
|---|---|---|---|
| 2011/0225992 A1* | 9/2011 | Lee | F24F 1/56 |
| | | | 62/236 |
| 2019/0360380 A1* | 11/2019 | Dudar | F01P 7/14 |
| 2020/0072178 A1* | 3/2020 | Berkson | B60W 10/26 |
| 2020/0232686 A1* | 7/2020 | Arnedo | F25B 27/00 |

FOREIGN PATENT DOCUMENTS

| | | | | |
|---|---|---|---|---|
| EP | 2262048 A1 | 12/2010 | | |
| JP | 2013152821 A | * | 8/2013 | .......... H01M 10/613 |

OTHER PUBLICATIONS

Power, M. (Jul. 27, 2020). "Pros and Cons of Solar-Powered Air Conditioners", Green Builder Media, originally published Mar. 1, 2017, available at https://www.greenbuildermedia.com/blog/pros-and-cons-of-solar-powered-air-conditioners.

HotSpot Energy Inc. "Solar Air Conditioner Heat Pump, 3 Models ACDC 100% Solar Air Conditioner, ACDC12C / ACDC18C / ACDC24C No AC Power or Grid Connection Required", Retrieved Feb. 16, 2024, from www.hotspotenergy.com/solar-air-conditioner.

* cited by examiner

*Primary Examiner* — Karie O'Neill Apicella
(74) *Attorney, Agent, or Firm* — Eversheds Sutherland (US) LLP

(57) ABSTRACT

The disclosed technology includes devices, systems, and methods for a battery-integrated heat pump system. The disclosed technology can include a heat pump system having a battery, a compressor, and a variable speed drive in electrical communication with the battery and the compressor. The variable speed drive can be configured to control a speed of the compressor. The heat pump system can include a fan that can be configured to move air across a heat exchanger coil of the heat pump system and the battery can be located in an airflow path of the fan such that the fan can also move air across the battery to regulate a temperature of the battery.

11 Claims, 5 Drawing Sheets

BATTERY-INTEGRATED HEAT PUMP SYSTEMS AND METHODS THERETO

FIELD OF TECHNOLOGY

The disclosed technology relates generally to heat pump systems and, more particularly, to battery-integrated heat pump systems.

BACKGROUND

Some existing air conditioning systems and heat pump systems incorporate compressors and fans that can be operated at variable speeds to attain a desired heating or cooling output. To ensure the components are operated properly, many air conditioning systems and heat pump systems utilize a variable speed drive (VSD) to control the speed of the compressor or fan. The VSD generally converts alternating current (AC) to direct current (DC) and then converts the direct current back to an alternating current having a predetermined frequency to control the speed of the connected AC motor (e.g., the AC motor of the compressor or fan). Converting the power input from AC to DC and then converting the DC power back to AC power results in a conversion loss and can reduce the overall efficiency of the system. To make matters worse, air conditioning systems and heat pump systems that are powered by solar, wind, battery, or other DC power sources typically convert the source DC power to AC power before delivering the converted AC power to the VSD. This additional step of converting DC power to AC power can result in total conversion losses of approximately 30-35% and often requires the air conditioning system or heat pump system to utilize larger batteries or additional sources of DC power such as additional solar panels or wind turbines.

Another common issue with DC-powered air conditioning or heat pump systems is that the batteries used with the system must be kept within a specific temperature range to ensure the batteries continue to operate properly. This is particularly a challenge when the batteries are stored in environments that experience low ambient temperatures and/or high ambient temperatures. For example, some batteries are unable to efficiently perform at ambient temperatures above 100° F. or below 32° F. Beyond the negative impact to performance efficiency, if a battery is exposed to ambient temperatures outside of the battery's designed temperature range, the battery can become damaged and/or the battery can eventually become incapable of maintaining a charge.

What is needed, therefore, is a device and system that can reduce the inefficiencies of an air conditioning system having a variable frequency drive and can also ensure the batteries are kept within an optimal operating temperature range.

These and other problems are addressed by the technology disclosed herein.

SUMMARY

The disclosed technology relates generally to heat pump systems and, more particularly, to battery-integrated heat pump systems. The disclosed technology can include a heat pump system that can have a battery, a compressor, and a fan in electrical communication with the battery. The fan can be configured to move air across a heat exchanger coil of the heat pump system. The battery can be located in an airflow path of the fan and the fan can be further configured to move air across an outer surface or other heat transfer surface provided in the battery package of the battery to regulate a temperature of the battery.

The heat pump system can include a variable speed drive that can be in electrical communication with the battery and the compressor. The variable speed drive can be configured to receive direct current power from the battery and output a modulated direct current power to the compressor to control a speed of the compressor. Alternatively, or in addition, the variable speed drive can be configured to receive direct current power from the battery and output a modulated alternating current power to the compressor to control a speed of the compressor. The variable speed drive can be configured to control a speed of the fan.

The fan can be further configured to move air across the heat transfer surface of the battery and subsequently across the heat exchanger coil such that a heat generated by the battery can be directed to the heat exchanger coil by the fan.

The heat pump system can be configured to reverse a direction of the fan such that, in a first direction, the fan moves air across the heat transfer surface of the battery and subsequently across the heat exchanger coil. In a second direction, the fan can be configured to move air across the heat exchanger coil and subsequently across the heat transfer surface of the battery.

The heat pump system can have a damper that can be located in the airflow path between the fan and the battery. The damper can be configured to direct at least some of the air moved by the fan away from the battery.

The heat pump system can include a battery temperature sensor configured to detect a temperature of the battery, an ambient air temperature sensor configured to detect a temperature of ambient air, an outlet air temperature sensor configured to detect a temperature of outlet air from the heat exchanger, and a controller in communication with the battery temperature sensor and the ambient air temperature sensor. The controller can be configured to receive battery temperature data from the battery temperature sensor and ambient air temperature data from the ambient air temperature sensor. The controller can be configured to determine whether air should be moved across the heat transfer surface of the battery, based at least in part on the battery temperature data and the ambient air temperature data indicating that the temperature of the battery is greater than the temperature of the ambient air. The controller can output a control signal to the fan to move air across the heat transfer surface of the battery. The controller can be configured to determine that the fan should operate at a higher speed, based at least in part on the battery temperature being greater than a battery high threshold temperature. The controller can be configured to output a control signal to the fan to increase a speed of the fan.

The controller can be configured to determine that a position of the damper should be changed to deflect at least some of the air moved by the fan away from the battery, based at least in part on the battery temperature being greater than a battery high threshold temperature. The controller can output a control signal to the damper to change a position of the damper to deflect the air moved by the fan away from the battery.

The heat pump system can further include an outlet air temperature sensor that can be configured to detect a temperature of outlet air from the heat exchanger. The controller can be further configured to receive outlet air temperature data from the outlet air temperature sensor. The controller can determine whether the outlet air should be moved across the heat transfer surface of the battery, based at least in part on the outlet air temperature data indicating that the outlet air temperature is less than the temperature of the battery. The controller can output a control signal to the fan to move outlet air across the heat transfer surface of the battery.

The heat pump system can include a photovoltaic cell and/or a wind turbine configured to charge the battery. Alternatively, or in addition, the heat pump system can be configured to receive an alternating current from an electrical grid system.

The disclosed technology can include a heat pump system having a direct current power source, a compressor configured to compress a refrigerant of the heat pump system, and a variable speed drive in electrical communication with the direct current power source and the compressor. The variable speed drive can be configured to receive direct current power from the direct current power source and output a modulated direct current power to control a speed of the compressor.

The heat pump system can include a fan that is in electrical communication with the direct current power source. The fan can be configured to move air across a heat exchanger coil of the heat pump system. The direct current power source can include a photovoltaic cell and a battery in electrical communication with the photovoltaic cell and the variable speed drive. The battery can be configured to receive an electrical charge from the photovoltaic cell and provide the direct current power to the variable speed drive. The battery can be located in an airflow path of the fan.

The heat pump system can be configured to change a rotational direction of the fan such that, in a first direction (e.g., in a counter-clockwise direction), the fan moves air across an heat transfer surface of a battery and subsequently across a heat exchanger coil. In a second direction (e.g., in a clockwise direction), the fan can move air across the heat exchanger coil and subsequently across the heat transfer surface of the battery.

The heat pump system can include a battery temperature sensor configured to detect a temperature of a battery, an ambient air temperature sensor configured to detect a temperature of ambient air, an outlet air temperature sensor configured to detect a temperature of outlet air from the heat exchanger, and a controller in communication with the battery temperature sensor and the ambient air temperature sensor. The controller can be configured to receive battery temperature data from the battery temperature sensor and ambient air temperature data from the ambient air temperature sensor.

The controller can be configured to determine whether air should be moved across an heat transfer surface of the battery, based at least in part on the battery temperature data and the ambient air temperature data indicating that the temperature of the battery is greater than the temperature of the ambient air. The controller can be configured to output a control signal to the fan to move air across the heat transfer surface of the battery.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

Figure 1:
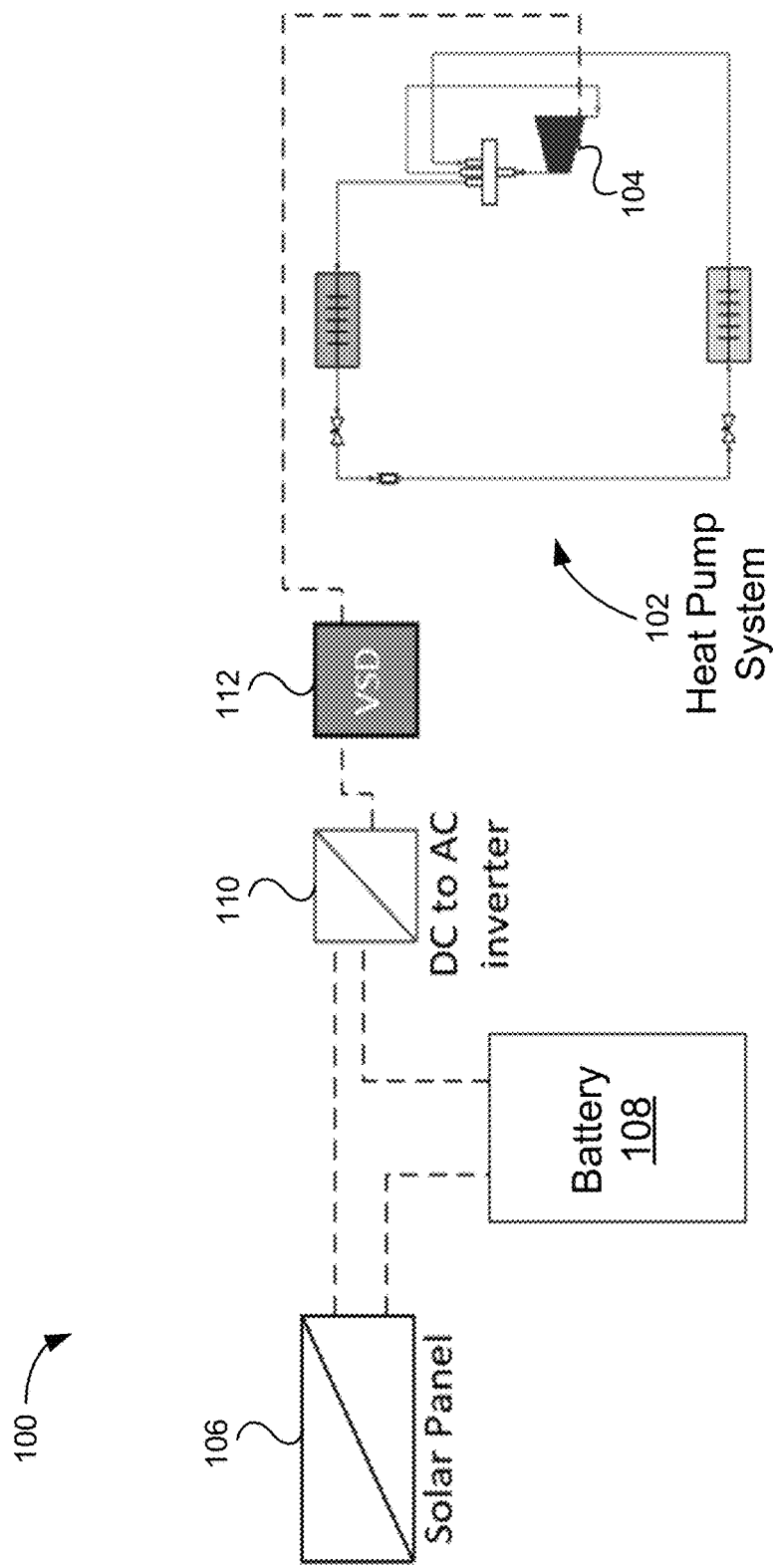
FIG. 1 illustrates an existing battery-integrated heat pump system.

The disclosed technology can include a heat pump system that can be powered by a direct current power source such as a battery, a solar power source, a wind power source, and/or any other suitable direct current power source. The disclosed technology can reduce the inefficiencies common to many battery-integrated heat pump systems by including a variable speed drive (VSD) that can receive a direct current input and modulate a direct current output to various components of the heat pump system. By eliminating the need to convert the power between alternating current and direct current, the disclosed technology can reduce the conversion losses associated with converting the power between alternating current and direct current. The disclosed technology can further increase the efficiency of the heat pump system by strategically locating the battery and a heat exchanger unit to help regulate the temperature of the battery and/or to increase the efficiency of the heat pump (e.g., by utilizing heat generated by the battery to preheat the air drawn across the heat exchanger coil when the heat pump is in heat mode). Further configurations and advantages of the disclosed technology will become apparent throughout this disclosure.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being systems and methods for use with a battery-integrated heat pump system. The present disclosure, however, is not so limited, and can be applicable in other contexts. The present disclosure can include devices and systems for use with variable speed heat pump systems, fixed speed heat pump systems, packaged heat pump systems, heat pump water heaters, air conditioning systems, refrigeration systems, and other similar systems. Accordingly, when the present disclosure is described in the context of battery-integrated heat pump systems, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Referring now to the drawings, in which like numerals represent like elements, the present disclosure is herein described. FIG. 1 illustrates a DC-powered heat pump system 100 in accordance with heat pump systems currently known in the art. The system 100 illustrated in FIG. 1 includes a heat pump system 102 that can be operated by receiving power from a DC power source, such as a solar panel 106 or other photovoltaic cell and/or a battery 108. Typically, existing systems include three power conversions: (1) the DC power from the solar panel 106 and/or the battery 108 is converted to AC power by passing through an inverter 110; (2) the AC power is passed from the inverter 110 to a variable speed drive 112; and (3) the variable speed drive 112 then converts the AC power back to DC power to control the speed of the compressor 104 of the heat pump system 102. By converting between DC power and AC power multiple times, the system 100 experiences multiple conversion losses that creates inefficiency in the system 100. In some systems, the conversions losses can account for efficiency losses of approximately 30-35%. To compensate for these inefficiencies, systems often require equipment that is otherwise oversized (e.g., a larger battery 108 or multiple batteries and/or a greater number of solar panels 106), which can increase the overall cost of the system 100 (e.g., manufacturing costs, shipping costs, installation costs, maintenance costs).

Figure 2:
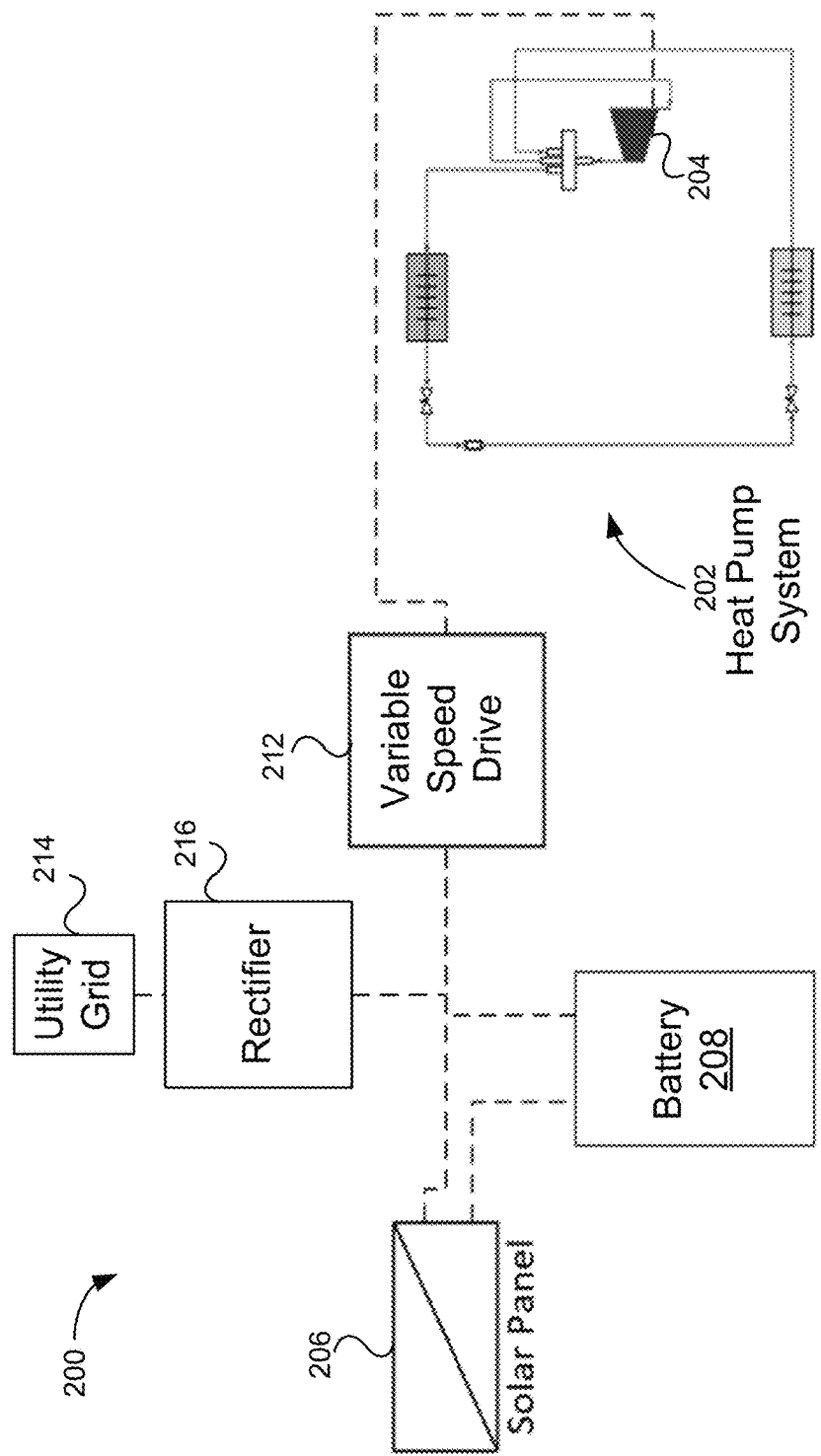
FIG. 2 illustrates a schematic view of an example battery-integrated heat pump system, in accordance with the disclosed technology.

The presently disclosed technology reduces the inefficiencies in a DC-powered heat pump system, such as by directly utilizing DC power from the battery 208 and/or the solar panel 206 without unnecessary power conversions. As illustrated in FIG. 2, the battery-integrated heat pump system 200 of the present disclosure can eliminate the need for an inverter by including a variable speed drive 212 that is configured to receive a DC power from the battery 208 and/or the solar panel 206 and output a modulated DC power to control a speed of the compressor 204. By directly using DC power to control the speed of the compressor 204, the disclosed technology can reduce the amount of conversion losses experienced by the system 200.

Although described as providing modulated DC power to the compressor 204, the variable speed drive 212 can be configured to output a modulated AC power to the compressor 204 if the compressor 204 is configured to receive an AC power source. Furthermore, the variable speed drive 212 can be further configured to control a speed of other components of the heat pump 202, including a fan, an expansion valve, and other components of the heat pump 202. Furthermore, the output from the variable speed drive 212 can be either a modulated DC power or a modulated AC power depending on the configuration of the various components the variable speed drive 212 is configured to control. As used herein, and as will be appreciated by one of skill in the art, the term modulated DC power can include controlling a voltage of the DC power and the term modulated AC power can include controlling a voltage and/or frequency of the AC power.

Although illustrated as including a solar panel 206, the disclosed technology can include other DC power sources in addition to, or in place of, the solar panel 206. The disclosed technology can include other DC power sources such as thermal electric generators, gas generators, wind generators, or other suitable power sources that are configured to output a DC power. Alternatively, or in addition, the system 200 can be connected to a utility grid 214 or other AC power source. A rectifier 216 can be used to convert the AC power from the utility grid 214 or other AC power source to DC power prior to supplying the variable speed drive 212 with the DC power. Alternatively, or in addition, the variable speed drive 212 can be configured to receive both AC power and DC power.

Figure 3:
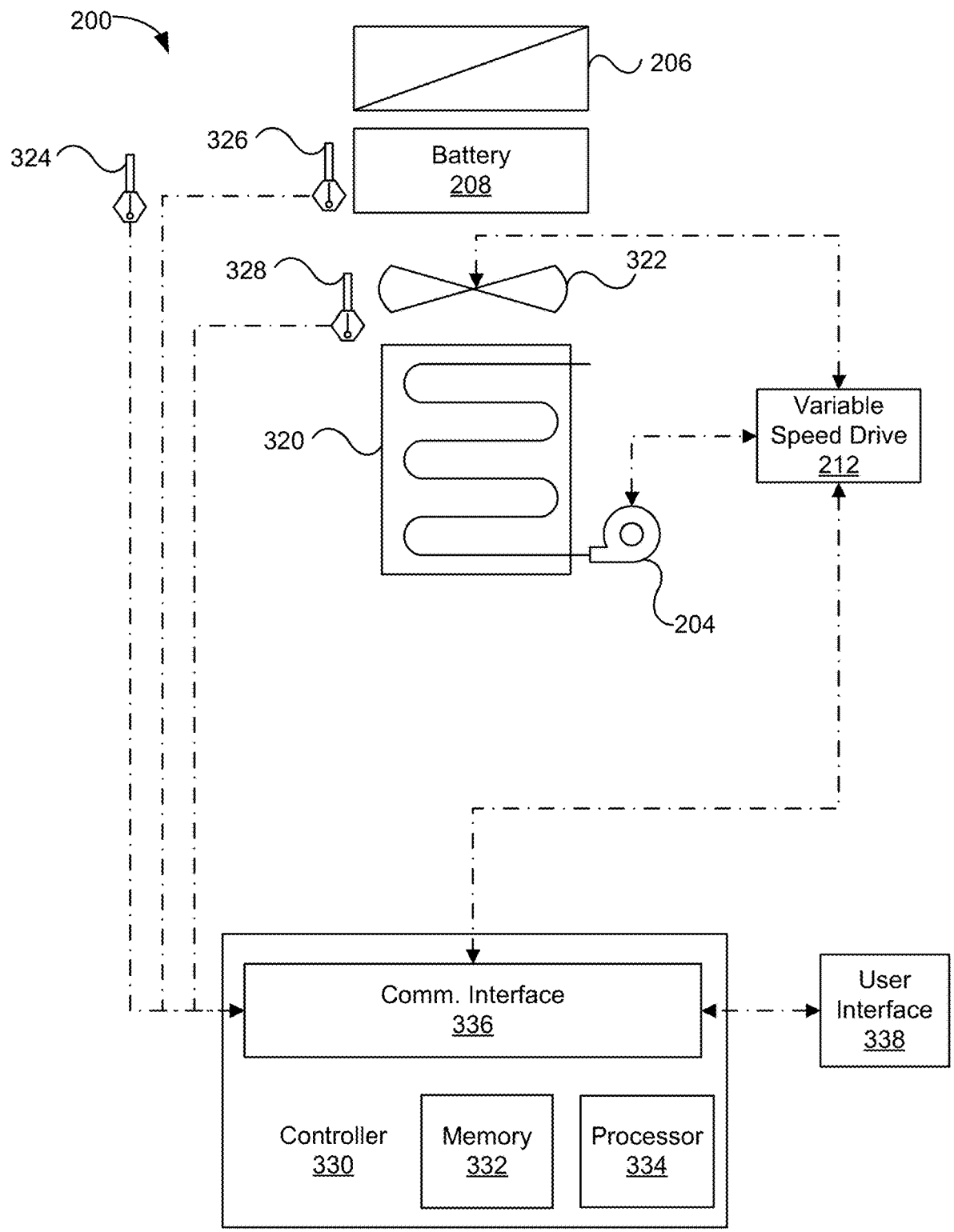
FIG. 3 illustrates a schematic view of an example battery-integrated heat pump system, in accordance with the disclosed technology.

As shown in FIG. 3, the system 200 can include a heat exchanger coil 320 that can be connected to, or otherwise in fluid communication with, the compressor 204. The system 200 can include a fan 322 that can be configured to move air across the heat exchanger coil 320. As will be appreciated by one of skill in the art, the heat exchanger coil 320, the compressor 204, and the fan 322 can each be part of an outdoor unit of the system 200.

The system 200 can be configured such that the battery 208 is positioned in an airflow path of the fan 322. That is, the fan 322 can be configured to move at least some of the air across the heat exchanger coil 320, and the battery 208 can be positioned such that air moves sequentially across the battery 208 (e.g., across a heat transfer surface of the battery 208 such as the outer surface of the battery and/or a heat sink in thermal communication with the battery 208) and the heat exchanger coil 320 and/or such that air moves sequentially across the heat exchanger coil 320 and the battery 208 (e.g., depending on the direction of the fan and/or an operating mode of the heat pump system 202). As previously described, the battery 208 typically must remain within a predetermined temperature range to ensure the battery 208 can operate properly. For example, some batteries 208 must remain at a temperature between −4° F. and 122° F. If the battery 208 is stored or operated outside of the predetermined temperature range for a prolonged period, the performance of the battery 208 can be negatively impacted, the battery 208 can be damaged, and/or the battery 208 can eventually become incapable of maintaining a charge. As will be described in greater detail herein, by positioning the battery 208 in an airflow path of the fan 322, the system 200 can help maintain the temperature of the battery 208 within the predetermined range. Furthermore, as will also be described in greater detail herein, the system 200 can be operated more efficiently in a heating mode by utilizing the heat generated by the battery 208 to preheat the air moved across the heat exchanger coil 320.

To help maintain the temperature of the battery 208, the system 200 can include a controller 330 that can receive battery temperature data from a battery temperature sensor 326, ambient air temperature data from an ambient temperature sensor 324, and/or outlet air temperature data from an outlet air temperature sensor 328 positioned between the heat exchanger coil 320 and the battery 208. The controller 330 can be configured to determine actions based on at least the battery temperature data, the ambient air temperature data, the outlet air temperature data, and/or the current operating status of the heat pump system 202.

To illustrate, when the system 200 is in a cooling mode, the controller 330 can receive battery temperature data from the battery temperature sensor 326 and determine, based on the battery temperature data, that the temperature of the battery 208 is greater than or equal to a high temperature threshold, which can be indicative of the battery 208 being overheated, nearly overheated, an upper operation temperature threshold, or the like. Following the determination that the temperature of the battery 208 is greater than or equal to the high temperature threshold, the controller 130 can output a control signal to the fan 322 to activate the fan 322 (or increase a speed of the fan 322) to move ambient air (or a greater amount of ambient air) across the battery 208 to reduce the temperature of the battery 208. As will be appreciated by one of skill in the art, by placing the battery 208 in the airflow path of the fan 322, the direction of the fan 322 can impact the battery's 208 rate of cooling. For example, if the heat pump system 202 is in a cooling mode and the fan 322 is turning in a direction in which the ambient air is first moved across the heat exchanger coil 320 and then across the battery 208, the ambient air is likely to gain heat energy as heat is transferred from the refrigerant to the ambient air through the heat exchanger coil 320. In this configuration, the controller 330 can determine that a direction of the fan 322 should be reversed to begin moving air across the battery 208 before moving air across the heat exchanger coil 320 to cool the battery 208 as the temperature of the ambient air is likely to be less than the temperature of the air directed across the heat exchanger coil 320 (e.g., because the heat exchanger coil 320 is discharging heat while the heat pump system 202 is in cooling mode).

Alternatively or in addition, when the system 100 is in the cooling mode, the controller 330 can receive ambient air temperature data from the ambient air temperature sensor 324, battery temperature data from the battery temperature sensor 326, and outlet air temperature data from the outlet air temperature sensor 328. The controller 330 can determine, based on the battery temperature data and the outlet air temperature data, that the temperature of the battery 208 is greater than the outlet air temperature. If the battery temperature data is indicative of the battery 208 being overheated, nearly overheated, or approaching an upper operation temperature threshold, the controller 330 can output a control signal to the fan 322 to activate the fan 322, increase a speed of the fan 322, and/or reverse a direction of the fan 322 to move outlet air (or a greater amount of outlet air) across the battery 208 to reduce the temperature of the battery 208. Alternatively, if the controller 330 determines that the outlet air temperature is greater than the ambient air temperature, the controller 330 can output a control signal to the fan 322 to reverse a direction of the fan 322 to begin moving ambient air across the battery 208.

When the system 200 is in a heating mode, the controller 330 can receive ambient air temperature data from the ambient temperature sensor 324 and/or battery temperature data from the battery temperature sensor 326 and determine, based at least in part on the battery temperature data and/or the ambient air temperature data, whether the airflow should be directed away from the battery 208. For example, if the controller 330 determines that the temperature of the battery 208 is less than a low temperature threshold, the controller 330 can determine that the air directed across the heat exchanger coil 320 should be first directed across the battery 208 before being directed across the heat exchanger coil 320. As will be appreciated by one of skill in the art, when the heat pump system 202 is in a heating mode, the heat exchanger coil 320 (e.g., the outdoor heat exchanger coil) removes heat from the ambient air directed across the heat exchanger coil 320 and causes the temperature of the air to decrease. Accordingly, directing the air across the battery 208 before the heat exchanger coil 320 can help to prevent further cooling of the battery 208.

The controller 330 can determine, based at least in part on the battery temperature data, the outlet air temperature, and/or the ambient air temperature data, that the fan 322 should be operated in a reverse direction. For example, if the fan 322 is operating such that air is first moved across the heat exchanger coil 320 before being moved across the battery 208, the controller 330 can determine that the direction of the fan 322 should be reversed based on the temperature of the battery 208 being greater than the ambient air temperature. Because the temperature of the battery is greater than the ambient air temperature, by reversing the direction of the fan 322 to move air across the battery 208 before moving air across the heat exchanger coil 320, the air being moved across the heat exchanger coil 320 can be heated prior to being moved across the heat exchanger coil 320. As will be appreciated by one of skill in the art, the heated air moved across the heat exchanger coil 320 from the battery 208 can help the heat pump system 202 to operate more efficiently in conditions with low ambient air temperatures because more heat energy can be transferred from the heated air to the refrigerant in the heat exchanger coil 320. In other words, heat generated by the battery 208 can be used to preheat the air that is directed across the heat exchanger coil 320 such that a greater amount of heat energy is available to be absorbed by the refrigerant in the heat exchanger coil 320, thus causing the heat pump system 202 to operate more efficiently in low ambient air temperatures.

Alternatively or in addition, when the system 100 is in a heating mode, the controller 330 can receive ambient air temperature data from the ambient air temperature sensor 324, battery temperature data from the battery temperature sensor 326, and outlet air temperature data from the outlet air temperature sensor 328. The controller 330 can determine whether the battery temperature is greater than the ambient air temperature. If the controller 330 determines that the battery temperature is less than the ambient air temperature, the controller 330 can output a control signal to the fan 322 to activate the fan 322, increase a speed of the fan 322, and/or reverse a direction of the fan 322 to move ambient air (or a greater amount of ambient air) across the battery 208 to increase the temperature of the battery 208. If the controller 330 determines that the battery temperature is less than a low battery temperature threshold, the controller 330 can output a control signal to the compressor 204 to operate the heat exchanger coil 322 as a condenser and a control signal to the fan 322 to activate the fan 322, increase a speed of the fan 322, and/or reverse a direction of the fan 322 to move outlet air (or a greater amount of outlet air) across the battery 208 to increase the temperature of the battery 208. As will be appreciated by one of skill in the art, by operating the heat exchanger coil 322 as a condenser, the heat exchanger coil 322 can provide heat to the outlet air directed across the battery 208 to provide heat to the battery 208. In this configuration, the refrigerant can also be configured to bypass the indoor heat exchanger to prevent cooling of the building.

Although illustrated in FIG. 3 as being located in an airflow path on the opposite side of the fan 322 from the heat exchanger coil 320, the battery 208 can be installed between the fan 322 and the heat exchanger coil 320, opposite the heat exchanger coil 320 from the fan 322 (i.e., below the heat exchanger coil 320 in FIG. 3), or any other location that is in the airflow path of the fan 322. By locating the battery 208 in the airflow path of the fan 322 from the heat exchanger coil 320, the system 200 can be configured to maintain a temperature of the battery 208 and utilize the heat generated by the battery 208 as described herein. As will be appreciated by one of skill in the art, by positioning the battery 208 above the fan (or otherwise in an airflow path opposite the fan 322 from the heat exchanger coil 320), an existing heat pump system 202 can be retrofitted to become the battery-integrated heat pump system 200. For example, many heat exchanger units currently used in the art include a fan mounted at the top of the heat exchanger unit. The disclosed technology could be applied to the existing heat exchanger unit by mounting the battery 208 above the fan, installing an ambient temperature sensor 324 and a battery temperature sensor 326, and upgrading the controller to be the controller 330.

The system 200 can include a solar panel 206 (or other photovoltaic cell) that is configured to provide an electrical charge to the battery 208 and/or provide a DC power to the compressor 204, the fan 322, and/or other components of the system 100. The solar panel 206 can be any type of solar panel including a monocrystalline, polycrystalline, or thin-film type solar panel. Furthermore, the solar panel 206 can be installed proximate the battery 208 or the solar panel 206 can be installed remote from the battery 208. If the solar panel 206 is installed proximate the battery 208, for example, the solar panel 206 can be installed above the battery 208 to provide shade to the battery 208 to help the battery 208 from overheating in high ambient temperatures.

The controller 330 can have a memory 332, a processor 334, and a communication interface 336. The controller 330 can be a computing device configured to receive data, determine actions based on the received data, and output a control signal instructing one or more components of the battery-integrated heat pump system 200 to perform one or more actions. One of skill in the art will appreciate that the controller 330 can be installed in any location, provided the controller 330 is in communication with at least some of the components of the system. Furthermore, the controller 330 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application. The hard-wired signal can include any directly wired connection between the controller and the other components described herein. Alternatively, the components can be powered directly from a power source and receive control instructions from the controller 330 via a digital connection. The digital connection can include a connection such as an Ethernet or a serial connection and can utilize any suitable communication protocol for the application such as Modbus, fieldbus, PROFIBUS, SafetyBus p, Ethernet/IP, or any other suitable communication protocol for the application. Furthermore, the controller 330 can utilize a combination of wireless, hard-wired, and analog or digital communication signals to communicate with and control the various components. One of skill in the art will appreciate that the above configurations are given merely as non-limiting examples and the actual configuration can vary depending on the particular application.

The controller 330 can include a memory 332 that can store a program and/or instructions associated with the functions and methods described herein and can include one or more processors 334 configured to execute the program and/or instructions. The memory 332 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 330 can also have a communication interface 336 for sending and receiving communication signals between the various components. Communication interface 336 can include hardware, firmware, and/or software that allows the processor(s) 334 to communicate with the other components via wired or wireless networks, whether local or wide area, private or public, as known in the art. Communication interface 336 can also provide access to a cellular network, the Internet, a local area network, or another wide-area network as suitable for the particular application.

Additionally, the controller 330 can have or be in communication with a user interface 338 for displaying system information and receiving inputs from a user. The user interface 338 can be installed locally or be a remote device such as a mobile device. The user, for example, can view system data on the user interface 338 and input data or commands to the controller 330 via the user interface 338. For example, the user can view threshold settings on the user interface 338 and provide inputs to the controller 330 via the user interface 338 to change a threshold setting.

Figure 4:
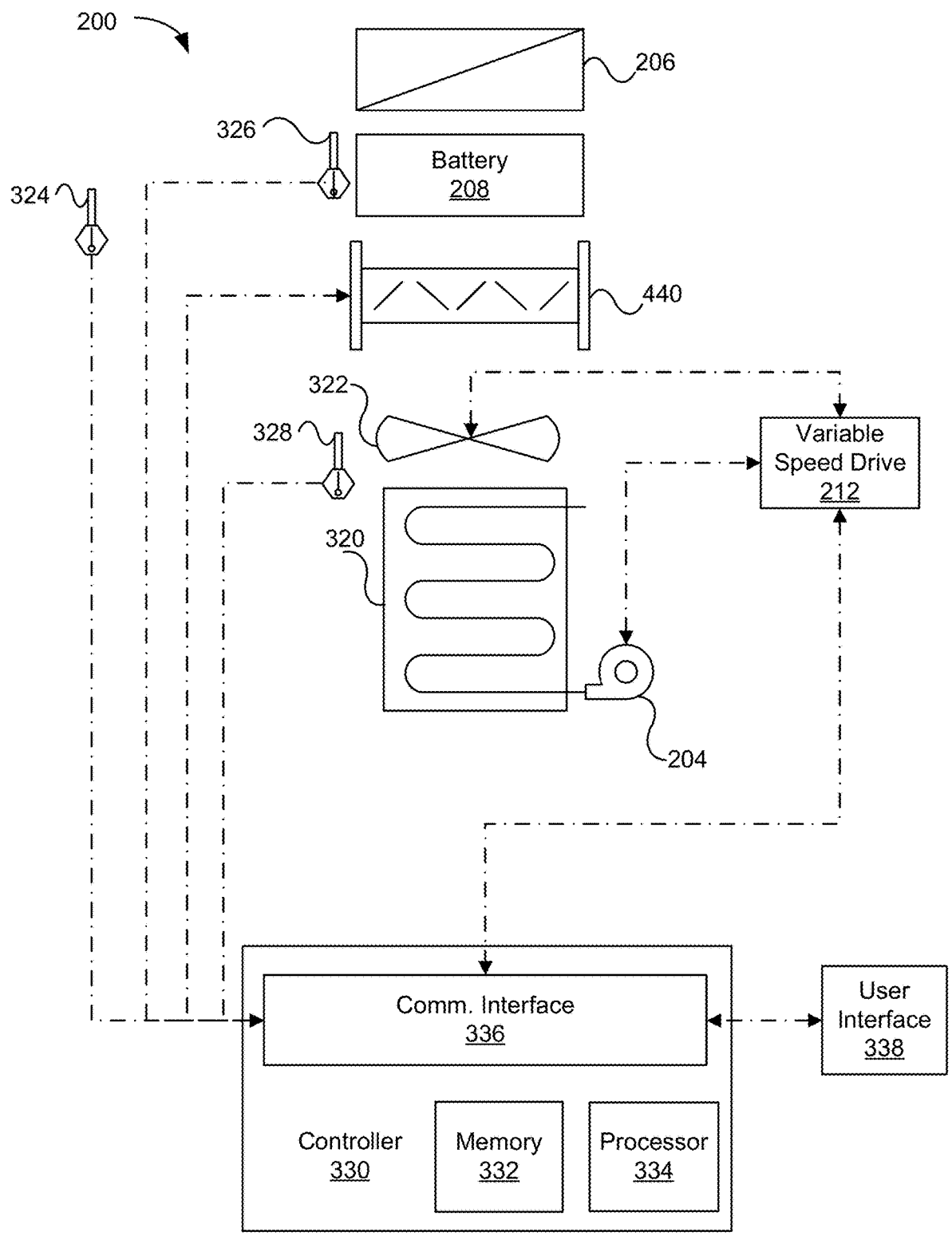
FIG. 4 illustrates a schematic view of an example battery-integrated heat pump system, in accordance with the disclosed technology.

As shown in FIG. 4, the system 200 can include a damper 440. The damper 440 can be configured to direct at least some of the air moved by the fan 322 toward or away from the battery 208 depending on the ambient air temperature data, the outlet air temperature data, the battery temperature data, and/or the mode of operation of the system 200. The damper 440 can be configured to actuate between a first position and a second position. The first position can direct air moved by the fan toward the battery 208 and the second position can direct air moved by the fan away from the battery 208. As will be appreciated by one of skill in the art, the damper 440 can be used to help control the temperature of the battery 208.

The controller 330, for example, can be configured to output a control signal to the damper 440 to actuate from the first position to the second position to direct air away from the battery 208 if the controller 330 determines, based at least in part on the battery temperature data received from the battery temperature sensor 326, that the temperature of the battery 208 is within an acceptable temperature range. Alternatively, or in addition, the controller 330 can be configured to output a control signal to the damper 440 to actuate from the first position to the second position to direct air away from the battery 208 if the controller 330 determines, based at least in part on the battery temperature data from the battery temperature sensor 326 and the outlet air temperature data from the outlet air temperature sensor 328, that the temperature of the outlet air is greater than the temperature of the battery 208 and the battery 208 is within an acceptable temperature range. The controller 330 can be configured to output a control signal to the damper 440 to actuate the damper 440 from the second position to the first position to direct air toward the battery 208 to cool or heat the battery 208 if the controller 330 determines, based at least in part on the battery temperature data received from the battery temperature sensor 326 and the outlet air temperature data from the outlet air temperature sensor 328, that the temperature of the battery 208 is greater than or equal to the high temperature threshold or less than or equal to the low temperature threshold.

Although illustrated as the battery 208 and damper 440 being installed opposite the fan 322 from the heat exchanger coil 320, one of skill in the art will appreciate that the battery 208 and the damper 440 can be installed between the heat exchanger coil 320 and the fan 322. Furthermore, the battery 208 and the damper 440 can be installed opposite the heat exchanger coil 320 from the fan 322 (i.e., below the heat exchanger coil 320 as depicted in FIG. 4) or in any other location provided the damper 440 and battery are in the airflow path of the fan 322 and the damper 440 is configured to direct air toward or away from the battery 208.

Figure 5:
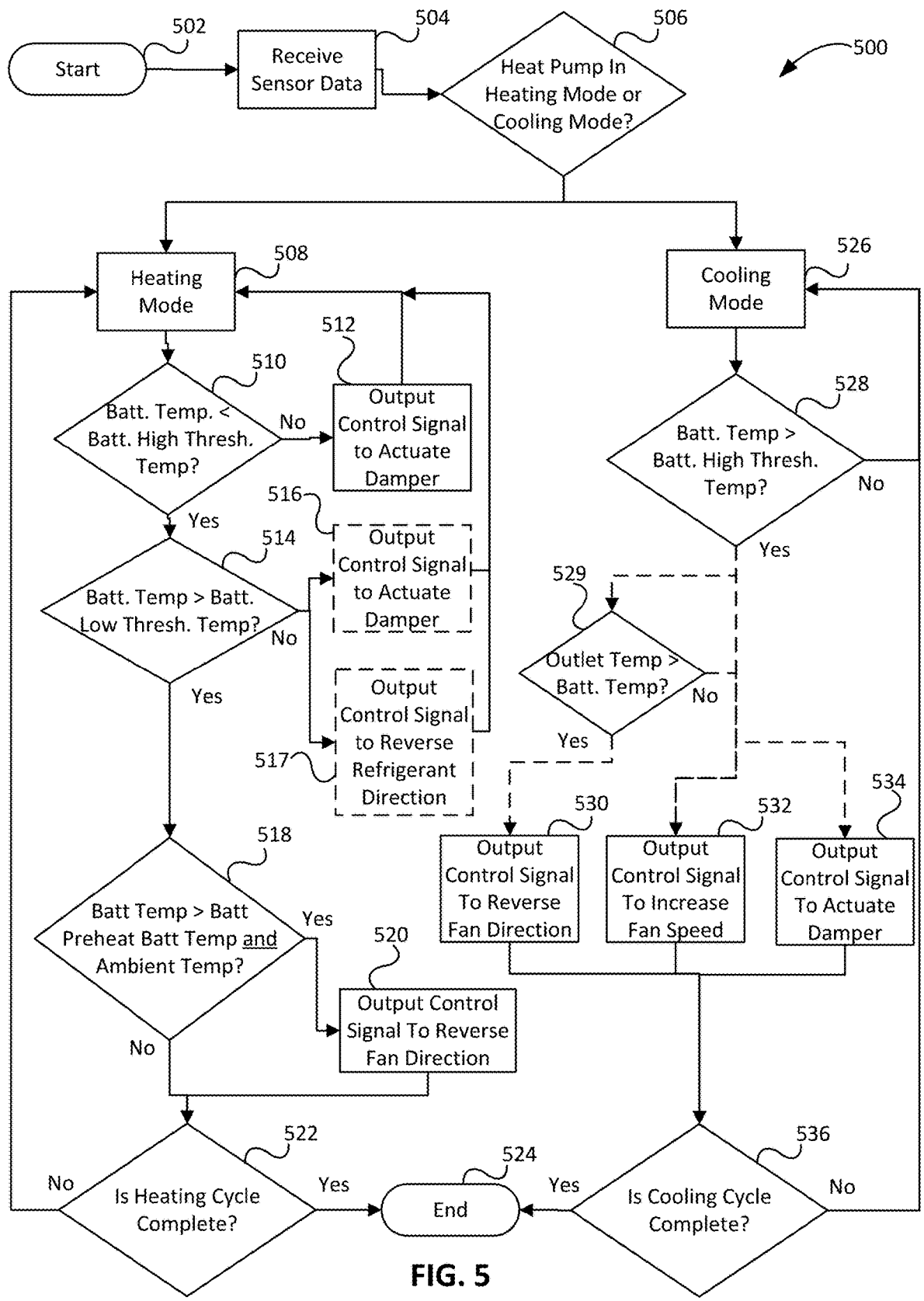
FIG. 5 illustrates a flowchart of an example method of operating a battery-integrated heat pump system, in accordance with the disclosed technology.

FIG. 5 illustrates a method 500 of operating a battery-integrated heat pump system, in accordance with the disclosed technology. The method 500 can include starting 502 a logic sequence such as by receiving a start signal or by initiating the method 500 (e.g., as power is received to the controller 330), for example. The method 500 can include receiving 504 sensor data from one or more sensors in the heat pump system (e.g., ambient temperature data from the ambient temperature sensor 324, battery temperature data from the battery temperature sensor 326, and/or outlet air temperature data from the outlet air temperature sensor 328). The method 500 can include determining 506 whether the heat pump system is in a heating mode or a cooling mode. Determining 506 whether the heat pump system is in a heating mode or a cooling mode can include transmitting an inquiry to the heat pump system and/or receiving data from the heat pump system indicating whether a heating cycle or a cooling cycle has been initiated. Additionally or alternatively, temperature data can be received from a temperature sensor (e.g., outlet air temperature sensor 328) located at or near a heat exchange coil of the heat pump system and comparing the temperature at or near the heat exchange coil to the ambient temperature, where the temperature of the heat exchanger coil being substantially less than the ambient temperature (e.g., at least a predetermined temperature difference) is indicative of the heat pump system being in a cooling mode and the temperature of the heat exchanger coil being substantially greater than the ambient temperature (e.g., at least a predetermined temperature difference) is indicative of the heat pump system being in a heating mode.

If the heat pump system is in a heating mode 508, the method 500 can include determining 510 whether the battery temperature is less than a battery high threshold temperature (e.g., based on the received sensor data). If the battery temperature is greater than or equal to the battery high threshold temperature, the method 500 can include outputting 512 a control signal to direct air across the battery (e.g., by adjusting the damper) and returning to the beginning of the heating mode 508. In this configuration, it is contemplated that the fan will normally operate in a direction such that air is moved across the heat exchanger coil before being moved across the battery. However, the method 500 can include reversing the direction of the fan in response to determining that the current direction of the fan is such that air is not moved across the heat exchanger coil before being moved across the battery (e.g., by monitoring the direction of fan rotation and comparing to the relative locations of the heat exchanger coil and the battery). As will be appreciated by one of skill in the art, by moving air across the heat exchanger coil and subsequently across the battery, the fan can reduce a temperature of the battery.

If the battery temperature is less than the battery high threshold temperature, the method 500 can include determining 514 whether the battery temperature is greater than a low threshold temperature of the battery. If the battery temperature is less than or equal to the low threshold temperature of the battery, the method 500 can include outputting 516 a control signal to actuate to direct the airflow away from the battery (e.g., by adjusting the damper). As will be appreciated by one of skill in the art, when the heat pump system is in a heating mode, the outdoor heat exchanger removes heat from the ambient air directed across the outdoor heat exchanger coil and causes the temperature of the air to decrease. Accordingly, actuating the damper to direct the airflow away from the battery can help to prevent further cooling of the battery. Alternatively, or in addition, the method 500 can include outputting 517 a control signal to reverse the direction in which the refrigerant flows through the heat exchanger (e.g., heat exchanger 320) to cause the heat exchanger to act as a condenser and provide heated outlet air to the battery.

If the battery temperature is greater than the low threshold temperature of the battery, the method 500 can include determining 518 whether the battery temperature is greater than the preheating battery temperature and the ambient temperature. The preheating battery temperature can be equal to the low threshold temperature of the battery. Alternatively, the preheating battery temperature can be greater than the low threshold temperature of the battery. If the battery temperature is greater than the preheating battery temperature and the ambient temperature, the method 500 can include outputting 520 a control signal to reverse a direction of the fan to cause the fan to move air across the battery before moving air across the heat exchanger coil. As will be appreciated by one of skill in the art, and as described herein above, when the ambient temperature is greater than the battery temperature, the heat generated by the battery can be used to preheat the air delivered to the heat exchanger coil.

The method 500 can include determining 522 whether the heating cycle is completed. If the heating cycle is not completed the method 500 can include returning to the beginning of the heating mode 508 and repeating the steps described above. If the heating cycle is completed, the method 500 can end 524 by stopping the heating cycle.

If it is determined 506 that the system is in a cooling mode 526, the method 500 can include determining 528 whether the battery temperature is greater than a high threshold temperature of the battery. If the battery temperature is less than or equal to a high threshold temperature of the battery, the method 500 can include returning to the beginning of the cooling mode 526.

If the battery temperature is greater than the high threshold temperature of the battery, the method 500 can include determining 529 whether the outlet temperature is greater than the battery temperature. If the outlet temperature is greater than the battery temperature, the method 500 can include outputting 530 a control signal to reverse the direction of the fan. For example, the method 500 can include reversing the direction of the fan in response to determining that the current direction of the fan is such that air is not moved across the battery before being moved across the heat exchanger coil (e.g., by monitoring the direction of fan rotation and comparing to the relative locations of the heat exchanger coil and the battery). Alternatively or in addition, if the battery temperature is greater than the high threshold temperature of the battery, the method 500 can include outputting 532 a control signal to increase the speed of the fan. For example, if the fan is already moving air across the battery before moving the air across the heat exchanger coil but the battery temperature is still greater than the high threshold temperature of the battery, the method 500 can increase the speed of the fan to facilitate greater cooling of the battery. Alternatively or in addition, if the battery temperature is greater than the high threshold temperature of the battery, the method 500 can include outputting 534 a control signal to actuate a damper to cause air to be directed toward the battery. For example, if the fan is already moving air across the battery but the damper is oriented to direct the air away from the battery, the method 500 can output a control signal to actuate the damper such that the air will be directed across the battery rather than away from the battery. As will be appreciated by one of skill in the art, each of reversing the direction of the fan, increasing the speed of the fan, and actuating the damper to direct air toward the battery—alone or in combination—can provide cooling to the battery by directing air from the fan across the battery.

The method 500 can include determining 536 whether the cooling cycle is complete. If the cooling cycle in not complete, the method 500 can include returning to the beginning of the cooling mode 526 can include repeating the actions just described. If the cooling cycle is complete, the method 500 can end 524 by stopping the cooling cycle.

As will be appreciated, the method 500 just described can be varied in accordance with the various elements and implementations described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method.

While the present disclosure has been described in connection with a plurality of example aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims. Moreover, various aspects of the disclosed technology have been described herein as relating to methods, systems, devices, and/or non-transitory, computer-readable medium storing instructions. However, it is to be understood that the disclosed technology is not necessarily limited to the examples and embodiments expressly described herein. That is, certain aspects of a described system can be included in the methods described herein, various aspects of a described method can be included in a system described herein, and the like.

What is claimed is:

1. A heat pump system comprising:
   a battery;
   a compressor;
   a fan in electrical communication with the battery, the fan being configured to move air across a heat exchanger coil of the heat pump system,
   wherein the battery is located in an airflow path of the fan and the fan move moves air across a heat transfer surface of the battery to regulate a temperature of the battery;
   a damper disposed in the airflow path between the fan and battery, the damper actuates between a first position and a second position, wherein in the first position, the damper directs at least some of the air moved by the fan toward the battery, and in the second position, the damper directs at least some of the air moved by the fan away from the battery;
   an outlet air temperature sensor positioned proximate to the heat exchanger coil;
   a battery temperature sensor configured to detect a temperature of the battery; and
   a controller coupled to the outlet air temperature sensor and the fan;
   wherein the controller:
      receives outlet air temperature data from the outlet air temperature sensor, the outlet air temperature data indicating a temperature of air that is proximate to the heat exchanger coil;
      receives the temperature of the battery; and
      operates, based on the temperature of the battery and the temperature of air that is proximate to the heat exchanger coil, the damper to direct at least some of the air moved by the fan across the heat exchanger coil towards the battery.

2. The heat pump system of claim 1 further comprising a variable speed drive in electrical communication with the battery and the compressor, the variable speed drive receives direct current power from the battery and outputs a modulated direct current power to the compressor to control a speed of the compressor.

3. The heat pump system of claim 1 further comprising a variable speed drive in electrical communication with the battery and the compressor, the variable speed drive receives direct current power from the battery and outputs a modulated alternating current power to the compressor to control a speed of the compressor.

4. The heat pump system of claim 1 further comprising a variable speed drive in electrical communication with the battery and the fan, the variable speed drive being configured to control a speed of the fan.

5. The heat pump system of claim 1, wherein the fan further moves air across the heat transfer surface of the battery and subsequently across the heat exchanger coil such that heat generated by the battery is directed to the heat exchanger coil by the fan.

6. The heat pump system of claim 1, wherein the heat pump system reverses a direction of the fan such that, in a first direction, the fan moves air across the heat transfer surface of the battery and subsequently across the heat exchanger coil and, in a second direction, the fan moves air across the heat exchanger coil and subsequently across the heat transfer surface of the battery.

7. The heat pump system of claim 1 further comprising:
an ambient air temperature sensor configured to detect a temperature of ambient air;
wherein the controller is also in communication with the ambient air temperature sensor, wherein the controller further receives ambient air temperature from the ambient air temperature sensor.

8. The heat pump system of claim 7, wherein the controller further:
determines that the temperature of the battery is greater than the ambient air temperature;
determines that air should be moved across the heat transfer surface of the battery, based at least in part on the temperature of the battery and the ambient air temperature; and
outputs a control signal to the fan causing the fan to move air across the heat transfer surface of the battery.

9. The heat pump system of claim 7, wherein the controller further:
determines that the temperature of the battery is greater than a battery high threshold temperature; and
outputs a control signal causing the fan to increase a speed of the fan.

10. The heat pump system of claim 7 further comprising a damper located in the airflow path between the fan and the battery, wherein the controller further:
determines the temperature of the battery is greater than a battery high threshold temperature; and
outputs a control signal to the damper causing the damper to change a position of the damper to deflect the air moved by the fan away from the battery.

11. The heat pump system of claim 1, further comprising:
a battery recharging device disposed in a higher vertical position than the battery, wherein the battery recharging device is vertically aligned with the battery,
wherein the battery recharging device comprises a photovoltaic cell configured to charge the battery, and wherein the battery recharging device blocks sunlight from reaching the battery.

* * * * *